(12) United States Patent
Bhagwagar et al.

(10) Patent No.: US 7,687,591 B2
(45) Date of Patent: Mar. 30, 2010

(54) SOLVENTLESS SILICONE PRESSURE SENSITIVE ADHESIVES WITH IMPROVED HIGH TEMPERATURE COHESIVE STRENGTH

(75) Inventors: Dorab Edul Bhagwagar, Saginaw, MI (US); Loren Dean Durfee, Midland, MI (US); Michael Andrew Lutz, Hope, MI (US); Timothy Paul Mitchell, Clio, MI (US)

(73) Assignee: Dow Corning Corporation, Midland, MI (US)

( * ) Notice: Subject to any disclaimer, the term of this patent is extended or adjusted under 35 U.S.C. 154(b) by 1002 days.

(21) Appl. No.: 10/544,249

(22) PCT Filed: Mar. 16, 2004

(86) PCT No.: PCT/US2004/008157

§ 371 (c)(1),
(2), (4) Date: May 2, 2006

(87) PCT Pub. No.: WO2004/083334

PCT Pub. Date: Sep. 30, 2004

(65) Prior Publication Data

US 2006/0189767 A1    Aug. 24, 2006

Related U.S. Application Data

(60) Provisional application No. 60/455,193, filed on Mar. 17, 2003.

(51) Int. Cl.
C08G 77/12    (2006.01)

(52) U.S. Cl. .............................. 528/25; 528/31; 528/32

(58) Field of Classification Search .................... 528/25, 528/31, 32
See application file for complete search history.

(56) References Cited

U.S. PATENT DOCUMENTS

| | | | |
|---|---|---|---|
| 2,868,766 A | 1/1959 | Johannson | |
| 2,994,684 A | 8/1961 | Johannson | |
| 3,002,951 A | 10/1961 | Johannson | |
| 3,159,601 A | 12/1964 | Ashby | |
| 3,159,662 A | 12/1964 | Ashby | |
| 3,220,972 A | 11/1965 | Lamoreaux | |
| 3,296,291 A | 1/1967 | Chalk et al. | |
| 3,372,178 A | 3/1968 | Wu | |
| 3,410,886 A | 11/1968 | Roy | |
| 3,419,593 A | 12/1968 | Willing | |
| 3,516,946 A | 6/1970 | Modic | |
| 3,814,730 A | 6/1974 | Karstedt | |
| 3,928,629 A | 12/1975 | Chandra et al. | |
| 3,983,298 A | 9/1976 | Hahn et al. | |
| 3,989,668 A | 11/1976 | Lee et al. | |
| 3,996,195 A | 12/1976 | Sato et al. | |
| 4,234,713 A * | 11/1980 | LeGrow | 528/15 |
| 4,245,079 A | 1/1981 | Matsumoto et al. | |
| 4,427,801 A | 1/1984 | Sweet | |
| 4,461,867 A | 7/1984 | Surprenant | |
| 4,525,400 A | 6/1985 | Surprenant | |
| 4,525,566 A | 6/1985 | Homan et al. | |
| 4,616,076 A | 10/1986 | Ona et al. | |
| 4,649,491 A | 3/1987 | Manduley | |
| 4,705,765 A | 11/1987 | Lewis | |
| 4,726,964 A | 2/1988 | Isobe et al. | |
| 4,774,297 A | 9/1988 | Murakami et al. | |
| 4,900,779 A | 2/1990 | Leibfried | |
| 4,902,731 A | 2/1990 | Leibfried | |
| 4,988,779 A | 1/1991 | Medford et al. | |
| 5,036,117 A | 7/1991 | Chung et al. | |
| 5,097,054 A | 3/1992 | Yamamoto et al. | |
| 5,100,976 A | 3/1992 | Hamada et al. | |
| 5,110,882 A | 5/1992 | Hamada et al. | |
| 5,162,445 A | 11/1992 | Powers et al. | |
| 5,175,325 A | 12/1992 | Brown et al. | |
| 5,190,827 A | 3/1993 | Lin | |
| 5,200,543 A | 4/1993 | Inomata et al. | |
| 5,248,739 A | 9/1993 | Schmidt et al. | |
| 5,290,841 A | 3/1994 | Enami et al. | |
| 5,290,885 A | 3/1994 | Vincent et al. | |
| 5,292,586 A | 3/1994 | Lin et al. | |
| 5,344,906 A | 9/1994 | Westall | |
| 5,357,007 A | 10/1994 | Wengrovius et al. | |
| 5,366,809 A | 11/1994 | Schmidt et al. | |
| 5,378,790 A | 1/1995 | Michalczyk et al. | |
| 5,399,614 A | 3/1995 | Lin et al. | |
| 5,412,055 A | 5/1995 | Loo | |

(Continued)

FOREIGN PATENT DOCUMENTS

| | | |
|---|---|---|
| EP | 0 108 208 | 5/1984 |
| EP | 0259711 | 3/1988 |
| EP | 0 269 454 | 6/1988 |

(Continued)

OTHER PUBLICATIONS

Kurian et al., Novel Cyclosiloxane-Based Networks, Polymer Preprints 2003, 44(1), pp. 33-34.
Kurian et al., Novel Tricomponent Membranes Containing Poly(Ethylene Glycol)/Poly (Pentaamethylcyclopentasiloxane)/Poly (Dimethyulsiloxane) Domaines, Journal of Polymer Science: Part A: Polymer Chemistry, vol. 40, 3093-3102 (2002).

(Continued)

*Primary Examiner*—Kuo-Liang Peng
(74) *Attorney, Agent, or Firm*—Alan Zombeck

(57) ABSTRACT

This invention relates to silicone compositions suitable for forming pressure sensitive adhesives. More particularly, the present invention relates to solventless curable PSA compositions suitable for forming pressure sensitive adhesive compositions having improved high temperature cohesive strength while maintaining good tack and adhesive properties.

8 Claims, No Drawings

U.S. PATENT DOCUMENTS

| | | | |
|---|---|---|---|
| 5,426,167 A | 6/1995 | Powers et al. |
| 5,436,308 A | 7/1995 | Durfee et al. |
| 5,466,532 A | 11/1995 | Wengrovius et al. |
| 5,525,696 A | 6/1996 | Herzig et al. |
| 5,536,803 A | 7/1996 | Fujiki et al. |
| 5,545,831 A | 8/1996 | Kaiya et al. |
| 5,545,837 A | 8/1996 | Kobayashi |
| 5,548,051 A | 8/1996 | Michalczyk et al. |
| 5,575,831 A | 11/1996 | Yamamura et al. |
| 5,576,110 A | 11/1996 | Lin et al. |
| 5,581,008 A | 12/1996 | Kobayashi |
| 5,656,711 A | 8/1997 | Fukuda et al. |
| 5,670,596 A | 9/1997 | Razzano et al. |
| 5,691,435 A | 11/1997 | Herzig et al. |
| 5,830,969 A | 11/1998 | Ahmed Jallouli et al. |
| 5,883,215 A | 3/1999 | Bischoff et al. |
| 5,985,462 A | 11/1999 | Herzig et al. |
| 6,093,782 A | 7/2000 | Herzig et al. |
| 6,121,368 A | 9/2000 | Heying et al. |
| 6,127,502 A | 10/2000 | Krahnke et al. |
| 6,160,150 A | 12/2000 | Krahnke et al. |
| 6,177,519 B1 | 1/2001 | Chung et al. |
| 6,184,407 B1 | 2/2001 | Yoshitake et al. |
| 6,235,832 B1 | 5/2001 | Deng et al. |
| 6,252,100 B1 | 6/2001 | Herzig |
| 6,300,452 B1 | 10/2001 | Jukarainen et al. |
| 6,303,729 B1 | 10/2001 | Sato |
| 6,313,255 B1 | 11/2001 | Rubinsztajn |
| 6,353,075 B1 | 3/2002 | Hupfield et al. |
| 6,387,487 B1 | 5/2002 | Greenberg et al. |
| 6,406,793 B1 | 6/2002 | Aoki |
| 6,489,407 B1 | 12/2002 | Clark et al. |
| 6,528,584 B2 | 3/2003 | Kennedy et al. |
| 6,605,734 B2 | 8/2003 | Roy et al. |
| 6,797,772 B2 | 9/2004 | Nakayoshi et al. |
| 2005/0256286 A1 | 11/2005 | Asch et al. |
| 2006/0074212 A1 | 4/2006 | Chapman et al. |
| 2006/0111491 A1 | 5/2006 | Asch et al. |
| 2006/0116500 A1 | 6/2006 | Chapman et al. |

FOREIGN PATENT DOCUMENTS

| | | |
|---|---|---|
| EP | 0416471 | 3/1991 |
| EP | 0464706 | 1/1992 |
| EP | 0 581 539 | 2/1994 |
| EP | 0600512 | 6/1994 |
| EP | 0979837 | 2/2000 |
| EP | 1 070 734 | 1/2001 |
| EP | 1 295 927 | 3/2003 |
| EP | 0 355 991 | 11/2003 |
| WO | WO 03/093349 | 11/2003 |
| WO | WO 03/093369 | 11/2003 |

OTHER PUBLICATIONS

Backer, M., et al.: Si Chemical Shift Tensors of Sily Silicate Cages, Solid State Nuclear Magnetic Resonance, Netherlands, vol. 9, No. 2-4, Dec. 1997, pp. 241-255.

Koyava N. A., et al.: Synthesis of Organocyclosiloxanes with a Pre-determined Arrangement of Functional Groups on the Silicon Atoms, Journal of General Chemistry of the USSR, vol. 50, No. 8, 1980, pp. 1461-1465.

Sokolov, N. N., et al.: Organocyclosiloxanes I. Methylchlorocyclsosiloxanes, Journal of General Chemistry of the USSR, vol. 26, 1956, pp. 1061-1063.

Sokolov, N. N., et al.: Organocyclosiloxanes II. Methylchlorocyclsosiloxanes, Journal of General Chemistry of the USSR, vol. 26, 1956, pp. 2545-2547.

Sakiyama, M., et al.: The Selective Halogenation of Methylhydropolysiloxanes: Syntheses of Methylhalopolysiloxanes and Their Derivatives, Bulletin of the Chemical Society of Japan, vol. 38, No. 12, 1965, pp. 2182-2186.

Andrianov, K. A., et al.: Substitution Reactions in Organocyclosiloxanes Containing Functional Groups Attached to the Silicon Atom, Chemistry of Heterocyclic Compounds, vol. 8, 1972, pp. 1068-1070.

Andrianov, K. A. et al.: Heterofunctional Condensation of Chlorosilanes with Tetra- and Hexaphenylsiloxanediols, Chemistry of Heterocyclic Compounds, vol. 8, 1972, pp. 810-812.

Kurian et al., Synthesis And Characterization of Novel Amphiphilic Block Copolymers Di-, Tri, Multi-, and Star Blocks of PEG and PIB, Journal of Polymer Science: Part A: Polymer Chemistry, vol. 38, 3200-3209 (2000).

Kurian et al., Novel Tricontinuous Hydrophilic-Lipophilic-Oxyphilic Membranes: Synthesis and Characterization, Journal of Polymer Science: Part A: Polymer Chemistry, vol. 40, 1209-1217 (2002).

* cited by examiner

SOLVENTLESS SILICONE PRESSURE SENSITIVE ADHESIVES WITH IMPROVED HIGH TEMPERATURE COHESIVE STRENGTH

CROSS REFERENCE TO RELATED APPLICATIONS

This application is a U.S. national stage filing under 35 U.S.C. §371 of PCT Application No. PCT/US2004/00815 filed on 16 Mar. 2004, currently pending, which claims the benefit of U.S. Provisional Patent Application No. 60/455,193 filed 17 Mar. 2003 under 35 U.S.C. §119 (e). PCT Application No. PCT/US2004/00815 and U.S. Provisional Patent Application No. 60/455,193 are hereby incorporated by reference.

The present invention relates to silicone compositions suitable for forming pressure sensitive adhesives (PSAs). More particularly, the present invention relates to solventless curable PSA compositions suitable for forming pressure sensitive adhesive compositions having improved high temperature cohesive strength while maintaining good tack and adhesive properties.

Silicone compositions suitable for forming pressure sensitive adhesives have been reported in the patent literature. Many of these compositions contain solvent and thus have drawbacks associated with use, handling and emission of flammable and volatile organic compounds. Low solvent or solventless compositions are also known, however their high temperature performance, particularly cohesive strength as measured by lap shear, is deficient for some applications. It is very difficult to obtain lap shear stability above 400° F. (204° C.) (1 sq in (6.25 sq cm) overlap, 1 kg wt, 5 days) in a solventless, platinum (Pt) cure system, yet the benchmark for traditional solvent based, peroxide cured silicone PSAs is 500° F. (260° C.).

The present inventors have found that the addition of a reactive diluent to Pt cure solventless silicone PSA compositions provides properties such as excellent high temperature cohesive strength while maintaining good tack and adhesion performance. In addition, the viscosity of the composition is reduced significantly thus allowing good workability.

The invention relates to a solventless pressure sensitive adhesive comprising (A) at least one organosiloxane polymer having on average at least two aliphatic unsaturations per molecule; (B) at least one resin having $R_3SiO_{1/2}$ (M units) and $SiO_{4/2}$ (Q units) where each R is an independently chosen monovalent hydrocarbon group free from aliphatic unsaturation and comprising 1 to 20 carbon atoms; (C) at least one reactive diluent; (D) at least one Si—H containing crosslinker comprising an organohydrogensilicon compound having on average at least two silicon bonded hydrogen atoms per molecule; (E) at least one hydrosilylation catalyst; and (F) optionally at least one inhibitor.

The invention also relates to an article having on at least one surface a solventless pressure sensitive adhesive comprising (A) at least one organosiloxane polymer having on average at least two aliphatic unsaturations per molecule; (B) at least one resin having $R_3SiO_{1/2}$ (M units) and $SiO_{4/2}$ (Q units) where each R is an independently chosen monovalent hydrocarbon group free from aliphatic unsaturation and comprising 1 to 20 carbon atoms; (C) at least one reactive diluent; (D) at least one Si—H containing crosslinker comprising an organohydrogensilicon compound having on average at least two silicon bonded hydrogen atoms per molecule; (E) at least one hydrosilylation catalyst; and (F) optionally at least one inhibitor.

Component (A) comprises at least one organosiloxane polymer having on average at least two aliphatic unsaturations per molecule. As used herein, the term "aliphatic unsaturation" refers to a carbon-carbon multiple bond. Alternatively, the organosiloxane polymers of Component A can be described by the formula (I):

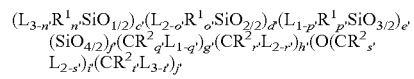

$$(L_{3-n'}R^1_{n'}SiO_{1/2})_{c'}(L_{2-o'}R^1_{o'}SiO_{2/2})_{d'}(L_{1-p'}R^1_{p'}SiO_{3/2})_{e'}$$
$$(SiO_{4/2})_{f'}(CR^2_{q'}L_{1-q'})_{g'}(CR^2_{r'}L_{2-r'})_{h'}(O(CR^2_{s'}L_{2-s'})_{i'}(CR^2_{t'}L_{3-t'})_{j'}$$

where each $R^1$ group is an independently selected monovalent hydrocarbon group comprising 1 to 20 carbon atoms which are free from aliphatic unsaturation and each L group is independently selected from a monovalent hydrocarbon group comprising 2 to 20 carbon atoms having at least one aliphatic unsaturation, a monovalent oxyhydrocarbon group comprising 2 to 20 carbon atoms having at least one aliphatic unsaturation, a halogen atom, an alkoxy group, or an acyl group, provided at least two L groups have at least one aliphatic unsaturation, the sum of c'+d'+e'+f'+g'+h'+i'+j' is at least 2, n' is an integer from 0 to 3, o' is an integer from 0 to 2, p' is an integer from 0 to 1, q' is an integer from 0 to 1, r' is an integer from 0 to 2, s' is an integer from 0 to 2, t' is an integer from 0 to 3, provided if g'+h'+i'+j'>0 then c'+d'+e'+f'>0.

In formula (I), each $R^1$ group is an independently selected monovalent hydrocarbon group comprising 1 to 20 carbon atoms that are free from aliphatic unsaturation. Each $R^1$ group can be linear, branched or cyclic. $R^1$ can be unsubstituted or substituted with halogen atoms. The monovalent hydrocarbon group of $R^1$ can be exemplified by alkyl groups such as methyl, ethyl, propyl, butyl, hexyl, octyl, 3,3,3-trifluoropropyl, chloromethyl, and decyl, cycloaliphatic groups such as cyclohexyl, aryl groups such as phenyl, tolyl, and xylyl, chlorophenyl, and aralkyl groups such as benzyl, styryl and alpha-methylstyryl. Alternatively, each $R^1$ group is an independently selected alkyl group comprising 1 to 8 carbon atoms or aryl group comprising 6 to 9 carbon atoms. Alternatively, each $R^1$ group is independently selected from methyl, alpha-methylstyryl, 3,3,3-trifluoropropyl and nonafluorobutylethyl. Each $R^1$ can be identical or different, as desired.

In formula (I), each $R^2$ group is an independently selected hydrogen atom or monovalent hydrocarbon group comprising 1 to 20 carbon atoms free from aliphatic unsaturation. Each monovalent hydrocarbon group of $R^2$ can be linear, branched or cyclic. Each monovalent hydrocarbon group of $R^2$ can be unsubstituted or substituted with halogen atoms. The monovalent hydrocarbon groups of $R^2$ are exemplified as described above for the monovalent hydrocarbon groups of $R^1$. Alternatively, each $R^2$ group is an independently selected hydrogen atom, alkyl group comprising 1 to 8 carbon atoms, or aryl group comprising 6 to 9 carbon atoms. Alternatively, each $R^2$ is hydrogen. Each $R^2$ can be identical or different, as desired.

In formula (I), each L is independently selected from a monovalent hydrocarbon group comprising 2 to 20 carbon atoms having at least one aliphatic unsaturation, a monovalent oxyhydrocarbon group comprising 2 to 20 carbon atoms having at least one aliphatic unsaturation, a halogen atom, an alkoxy group, or an acyl group, provided at least two L groups have at least one aliphatic unsaturation.

The aliphatic unsaturations of L can be found in a pendant position to the hydrocarbon chain, at the end of the hydrocarbon chain, or both. Alternatively, the aliphatic unsaturations of L can be found at the terminal positions. Each monovalent hydrocarbon and oxyhydrocarbon group can be linear, branched, or cyclic.

Examples of monovalent hydrocarbon groups comprising 2 to 20 carbon atoms having at least one aliphatic unsaturation of L include alkenyl groups such as vinyl, allyl, 3-butenyl, 4-pentenyl, 5-hexenyl, cyclohexenyl, 6-heptenyl, 7-octenyl, 8-nonenyl, 9-decenyl, 10-undecenyl, and diene groups comprising 4 to 20 carbon atoms such as 4,7-octadienyl, 5,8-nonadienyl, 5,9-decadienyl, 6,11-dodecadienyl, 4,8-nonadienyl, and 7,13-tetradecadienyl.

Examples of monovalent oxyhydrocarbon groups comprising 2 to 20 carbon atoms having at least one aliphatic unsaturation of L include alkenyloxy groups such as oxybutylvinylether and alkynyloxy groups such as propargyloxy or hexynyloxy.

Examples of halogen atoms of L include chloro, fluoro, and bromo atoms. Examples of alkoxy groups of L include methoxy, ethoxy, and isopropoxy. An example of an acyl group of L is acetoxy.

Alternatively, each L is an independently selected monovalent hydrocarbon group comprising 2 to 20 carbon atoms having at least one aliphatic unsaturation. Alternatively, each L is an independently selected alkenyl group comprising 2 to 20 carbon atoms. Alternatively, each L is an independently selected alkenyl group comprising 2 to 8 carbon atoms.

In formula (I), the sum of $c'+d'+e'+f'+g'+h'+i'+j'$ is at least 2, alternatively from 2 to 5300, alternatively from 2 to 1000. Alternatively, subscript $c'$ is an integer from 0 to 50. Alternatively, subscript $c'$ is an integer from 2 to 20. Alternatively, subscript $c'$ is an integer from 2 to 10. Alternatively, subscript $d'$ is an integer from 0 to 5000. Alternatively, subscript $d'$ is an integer from 0 to 500. Alternatively, subscript $d'$ is an integer from 1 to 300. Alternatively, subscript $e'$ is an integer from 0 to 48. Alternatively, subscript $e'$ is an integer from 0 to 30. Alternatively, subscript $e'$ is an integer from and 0 to 15. Alternatively, subscript $f'$ is an integer from 0 to 24. Alternatively, subscript $f'$ is an integer from 0 to 10. Alternatively, subscript $f'$ is an integer from 0 to 6. Alternatively, subscript $g'$ is an integer from 0 to 50. Alternatively, subscript $g'$ is an integer from 0 to 20. Alternatively, subscript $g'$ is an integer from 0 to 10. Alternatively, subscript $h'$ is an integer from 0 to 150. Alternatively, subscript $h'$ is an integer from 0 to 80. Alternatively, subscript $h'$ is an integer from 0 to 60. Alternatively, subscript $i'$ is an integer from 0 to 50. Alternatively, subscript $i'$ is an integer from 0 to 20. Alternatively, subscript $i'$ is an integer from 0 to 10. Alternatively, subscript $j'$ is an integer from 0 to 50. Alternatively, subscript $j'$ is an integer from 0 to 15. Alternatively, subscript $j'$ is an integer from 0 to 10.

In formula (I), $n'$ is an integer from 0 to 3, alternatively from 2 to 3; $o'$ is an integer from 0 to 2, alternatively from 1 to 2; $p'$ is an integer from 0 to 1, alternatively 1; $q'$ is an integer from 0 to 1, alternatively 1; $r'$ is an integer from 0 to 2, alternatively from 1 to 2; $S'$ is an integer from 0 to 2, alternatively from 1 to 2; and $t'$ is an integer from 0 to 3, alternatively from 2 to 3.

Generally, the viscosity of Component (A) ranges from 50 to 2000 millipascal-seconds (mPa·s) at 25° C. Alternatively, the viscosity of Component (A) ranges from 100 to 1000 mPa·s at 25° C. Alternatively, the viscosity of Component (A) ranges from 150 to 499 mPa·s at 25° C.

Examples of organosiloxane polymers included in Component (A) include trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, vinyldimethylsiloxy-terminated polydimethylsiloxane-polymethyhexenylsiloxane copolymers, trimethylsiloxy-terminated polymethylvinylsiloxane polymers, trimethylsiloxy-terminated polymethylhexenylsiloxane polymers, vinyldimethylsiloxy-terminated polydimethylsiloxane polymers, and hexenyldimethylsiloxy-terminated polydimethylsiloxane polymers, vinyldimethylsiloxy terminated poly(dimethylsiloxane-monomethylsilsesquioxane) polymers, vinyldimethylsiloxy terminated poly(dimethylsiloxane-vinylmethylsiloxane-methylsilsesquioxane) copolymers; trimethylsiloxy terminated poly(dimethylsiloxane-vinylmethylsiloxane-methylsilsesquioxane) polymers, hexenyldimethylsiloxy terminated poly(dimethylsiloxane-monomethylsilsesquioxane) polymers, hexenyldimethylsiloxy terminated poly(dimethylsiloxane-hexenylmethylsiloxane-methylsilsesquioxane) copolymers; trimethylsiloxy terminated poly(dimethylsiloxane-hexenylmethylsiloxane-methylsilsesquioxane) polymers, vinyldimethylsiloxy terminated poly(dimethylsiloxane-silicate) copolymers, hexenyldimethylsiloxy-terminated poly(dimethylsiloxane-silicate) copolymers, trimethylsiloxy terminated poly(dimethylsiloxane-vinylmethylsiloxane-silicate) copolymers and trimethylsiloxy terminated poly(dimethylsiloxane-hexenylmethylsiloxane-silicate) copolymers, vinylsiloxy or hexenylsiloxy terminated poly(dimethylsiloxane-hydrocarbyl copolymers), mixed trimethylsiloxy-vinyldimethylsiloxy terminated poly(dimethylsiloxane-silicate copolymers), mixed trimethylsiloxy-hexenyldimethylsiloxy terminated poly(dimethylsiloxane-silicate copolymers), mixed trimethylsiloxy-vinyldimethylsiloxy terminated poly(dimethylsiloxane-vinylmethylsiloxane-silicate) copolymers and mixed trimethylsiloxy-hexenyldimethylsiloxy terminated poly(dimethylsiloxane-hexenylmethylsiloxane-silicate) copolymers. vinylsiloxy terminated or hexenylsiloxy terminated poly(dimethylsiloxane-polyoxyalkylene) block copolymers, alkenyloxydimethylsiloxy terminated polyisobutylene and alkenyloxydimethylsiloxy terminated polydimethylsiloxane-polyisobutylene block copolymers.

Alternatively, examples of Component (A) include hexenyldimethylsiloxy-terminated polydimethylsiloxane-polymethylhexenylsiloxane copolymers, hexenyldimethylsiloxy-terminated polydimethylsiloxane polymers, vinyldimethylsiloxy-terminated polydimethylsiloxane polymers, vinyl or hexenyldimethylsiloxy-terminated poly(dimethylsiloxane-silicate) copolymers, mixed trimethylsiloxy-vinyldimethylsiloxy terminated poly(dimethylsiloxane-vinylmethylsiloxane-silicate) copolymers, and vinyl or hexenyldimethylsiloxy terminated poly(dimethylsiloxane-hydrocarbyl) copolymers.

Alternatively, examples of Component (A) include hexenyldimethylsiloxy-terminated polydimethylsiloxane copolymers, vinyldimethylsiloxy-terminated polydimethylsiloxane polymers, vinyldimethylsiloxy-terminated poly(dimethylsiloxane-silicate) copolymers.

Generally, Component (A) is present in the PSA composition in amounts from 15 to 40 weight percent. Alternatively, Component (A) is present in the PSA composition in amounts from 20 to 40 weight percent. The organosiloxane polymers of Component (A) are well known and are either commercially available or can be prepared by methods known in the art.

Component (B) comprises at least one resin having $R_3SiO_{1/2}$ (M units) and $SiO_{4/2}$, (Q units), where each R is an independently chosen monovalent hydrocarbon group free of aliphatic unsaturation and comprising 1 to 20 carbon atoms.

Examples of the monovalent hydrocarbon groups free of aliphatic unsaturation of R are as described above for $R^1$. Alternatively, each R is an independently selected alkyl group. Alternatively, each R group is methyl. The molar ratio of $R_3SiO_{1/2}$ (M units) to $SiO_{4/2}$ (Q units) is from 0.6:1 to 4:1. Alternatively, the molar ratio of M:Q is from 0.6:1 to 1.9:1. Alternatively, the molar ratio of M:Q is from 0.6:1 to 1.0:1. Component (B) may also comprise up to 5 weight percent silanol groups. Alternatively, Component (B) comprises no more than 1 weight percent silanol groups.

Generally, Component (B) is present in the PSA composition in amounts from 50 to 80 weight percent on a resin solids basis. Alternatively, Component (13) is present in amounts from 55 to 65 weight percent on the same basis. The resins of Component (B) are well known and are either commercially available as products generally supplied as a solution in an aromatic hydrocarbon solvent or can be prepared by methods known in the art.

Component (C) is a reactive diluent comprising at least one hydrocarbon compound comprising 8 to 18 carbon atoms and at least one aliphatic unsaturation. The reactive diluent may be linear or branched and the aliphatic unsaturation may be pendant or terminal. Examples of useful reactive diluents include: dodecene, tetradecene, hexadecene, and octadecene. Alternatively, the reactive diluent comprises at least one alkene comprising 8 to 18 carbon atoms having a terminal double bond. Alternatively, the reactive diluent comprises at least one alkene comprising 12 to 14 carbon atoms and a terminal double bond. Alternatively, the reactive diluent is tetradecene.

Component (C) is added to the present PSA composition in amounts from 1 to 7 weight percent. Alternatively, Component (C) is added to the present PSA composition in amounts from 3 to 6 weight percent. The reactive diluents of Component (C) are well known and are either commercially available or can be prepared by methods known in the art.

Component (D) comprises at least one Si—H containing crosslinker. The Si—H containing crosslinker is an organohydrogensiloxane having on average at least two silicon-bonded hydrogen atoms per molecule. Alternatively, Component (D) comprises at least one organohydrogensiloxane having on average at least three silicon-bonded hydrogen atoms per molecule. The organohydrogensiloxanes suitable as Component (D) can be linear, branched, cyclic, resins, and combinations thereof.

One type of organohydrogensiloxane useful as Component (D) can be exemplified by (D1) diorganohydrogensiloxy-terminated polydiorganosiloxane polymers, diorganohydrogensiloxy-terminated polyorganohydrogensiloxane polymers, diorganohydrogensiloxy-terminated polydiorganosiloxane-polyorganohydrogensiloxane copolymers, triorganosiloxy-terminated polydiorganosiloxane-polyorganohydrogensiloxane copolymers, triorganosiloxy-terminated polyorganohydrogensiloxane polymers, each having a degree of polymerization of from 2 to 1,000, and preferably from 5 to 100 and a viscosity at 25° C. of from 1 to 10,000 millipascal-seconds, and preferably from 5 to 100 millipascal-seconds. The organo substituent on these siloxanes is exemplified by a monovalent hydrocarbon group having from 1 to 20 carbon atoms exemplified by alkyl groups such as methyl, ethyl, propyl, butyl, hexyl, octyl, and decyl, cycloaliphatic groups such as cyclohexyl, aryl groups such as phenyl, tolyl, and xylyl, and aralkyl groups such as benzyl and phenylethyl. Alternatively, the organo substituent is methyl. The several organo substituents can be identical or different, as desired.

Alternatively, Component (D1) can be exemplified by dimethylhydrogensiloxy-terminated polydimethylsiloxane polymers, dimethylhydrogensiloxy-terminated polymethylhydrogensiloxane polymers, dimethylhydrogensiloxy-terminated polydimethylsiloxane-polymethylhydrogensiloxane copolymers, trimethylsiloxy-terminated polydimethylsiloxane-polymethylhydrogensiloxane copolymers, or trimethylsiloxy-terminated polymethylhydrogensiloxane polymers, each having a degree of polymerization of from 5 to 100 and a viscosity at 25° C. of from 5 to 100 millipascal-seconds.

The organohydrogensiloxanes comprising Component (D1) are commercially available or can be made by methods known in the art.

Another type of organohydrogensiloxane having on average at least 2 silicon-bonded hydrogen atoms per molecule useful in the present PSA composition is (D2) an organohydrogensiloxane reaction product having a viscosity of from 150 to 50,000 millipascal-seconds (mPa·s) (1 millipascal-second=1 centipoise). This organohydrogensiloxane reaction product is obtained by mixing: (a) at least one organohydrogensiloxane containing at least three silicon-bonded hydrogen groups per molecule, (b) at least one compound containing at least two alkenyl groups per molecule, and (c) a platinum group metal-containing catalyst which is present in an amount sufficient to provide 0.1 to 10 weight parts of platinum group metal per million weight parts of (a)+(b), with the proviso that the ratio of the number of silicon-bonded hydrogen atoms of Component (a) to the number of alkenyl groups of Component (b) is at least 4.6:1.

The organohydrogensiloxanes (a) useful to make the organohydrogensiloxane reaction product are as described above for Component (D1). The compounds containing at least two alkenyl groups per molecule (b) are as described above for Component (A). The platinum group metal-containing catalyst (c) useful herein is the same as will be described below for Component (E). The ratio of Si—H:Si-alkenyl useful to make these organohydrogensiloxane reaction products is at least 4.6:1, alternatively 4.6:1 to 500:1.

The organohydrogensiloxane reaction products (12) are commercially available or may be made by methods known in the art such as described in U.S. Pat. No. 6,489,407.

Another type of organohydrogensiloxane (D3) containing at least two silicon-bonded hydrogen atoms per molecule useful in the present PSA composition is described by formula (II):

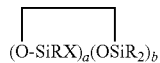

where each R is independently selected from a hydrogen atom and a monovalent hydrocarbon group comprising 1 to 20 carbon atoms which is free from aliphatic unsaturation, a is an integer from 1 to 18, b is an integer from 1 to 19, a+b is an integer from 3 to 20, each X is an independently selected functional group selected from a halogen atom, an ether group, an alkoxy group, an alkoxyether group, an acyl group, an epoxy group, an amino group, or a silyl group, or a -Z-$R^4$ group, where each Z is independently selected from an oxygen and a divalent hydrocarbon group comprising 2 to 20 carbon atoms, each $R^4$ group is independently selected from —$BR_uY_{2-u}$, —$SiR_vY_{3-v}$, or a group described by formula (III):

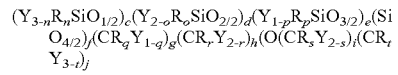

where B refers to boron, each R is as described above, the sum of c+d+e+f+g+h+i+j is at least 2, n is an integer from 0 to 3, o is an integer from 0 to 2, p is an integer from 0 to 1, q is an integer from 0 to 1, r is an integer from 0 to 2, s is an integer from 0 to 2, t is an integer from 0 to 3, u is an integer from 0 to 2, v is an integer from 0 to 3, each Y is an independently selected functional group selected from a halogen atom, an ether group, an alkoxy group, an alkoxyether group, an acyl group, an epoxy group, an amino group, or a silyl group, or a Z-G group, where Z is as described above, each G is a cyclosiloxane described by formula (I):

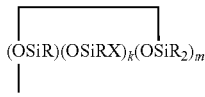

where R and X are as described above, k is an integer from 0 to 18, m is an integer from 0 to 18, k+m is an integer from 2 to 20, provided in formula (III) that one of the Y groups is replaced by the Z group bonding the $R^4$ group to the cyclosiloxane of formula (II), and provided further if g+h+i+j>0 then c+d+e+P0.

Examples of the types of organohydrogensiloxanes (D3) described by formula (II) useful in the present PSA composition are as follows where Me is methyl, d (which equals $d_1+d_2$) is as described above, and x can range from 1 to 100; preferably 1 to 20. Other examples include these same materials having 10 to 30% of the Si—H bonds replaced by functional groups derived by hydrosilylation of allylglycidyl ether.

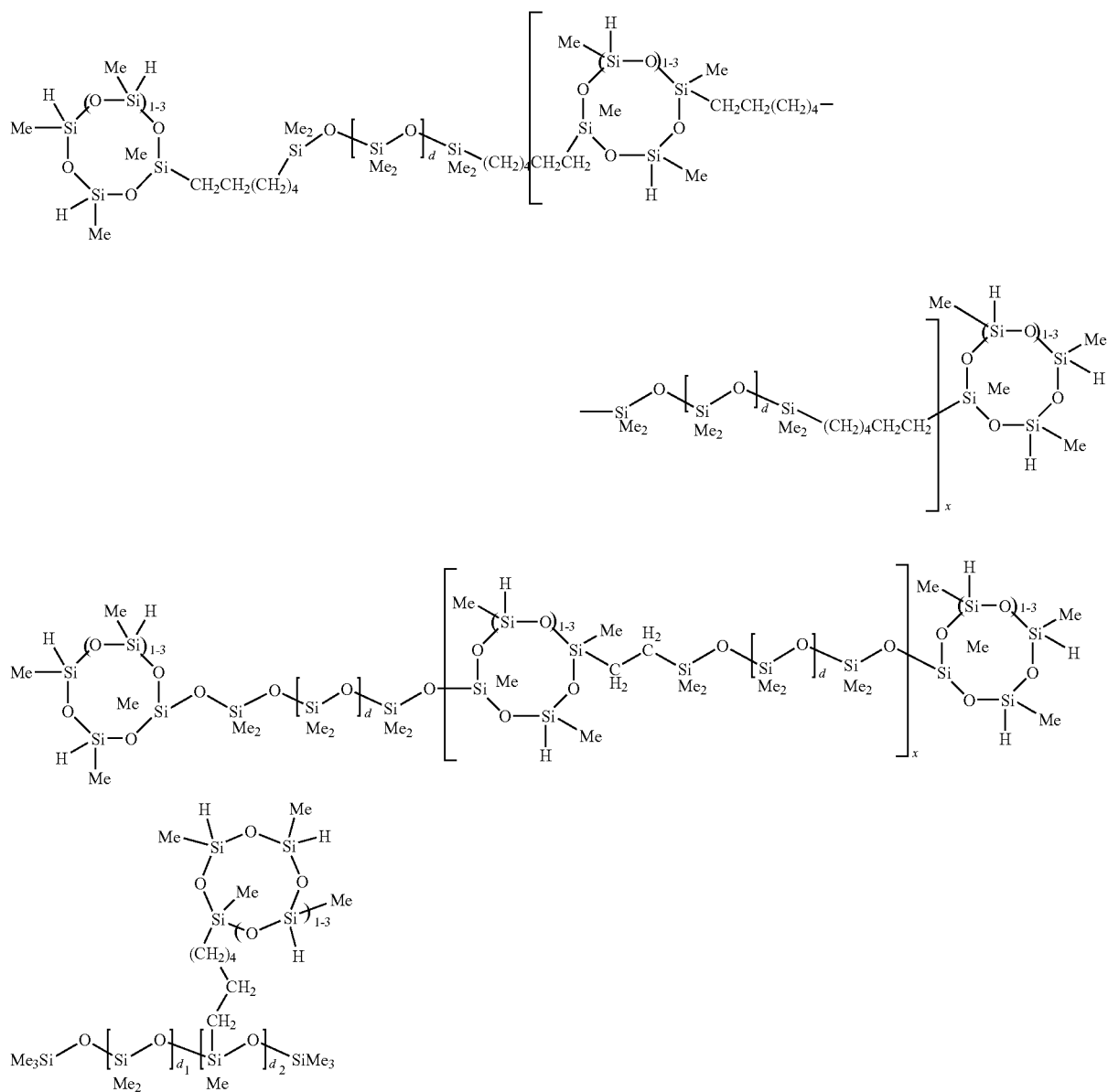

-continued
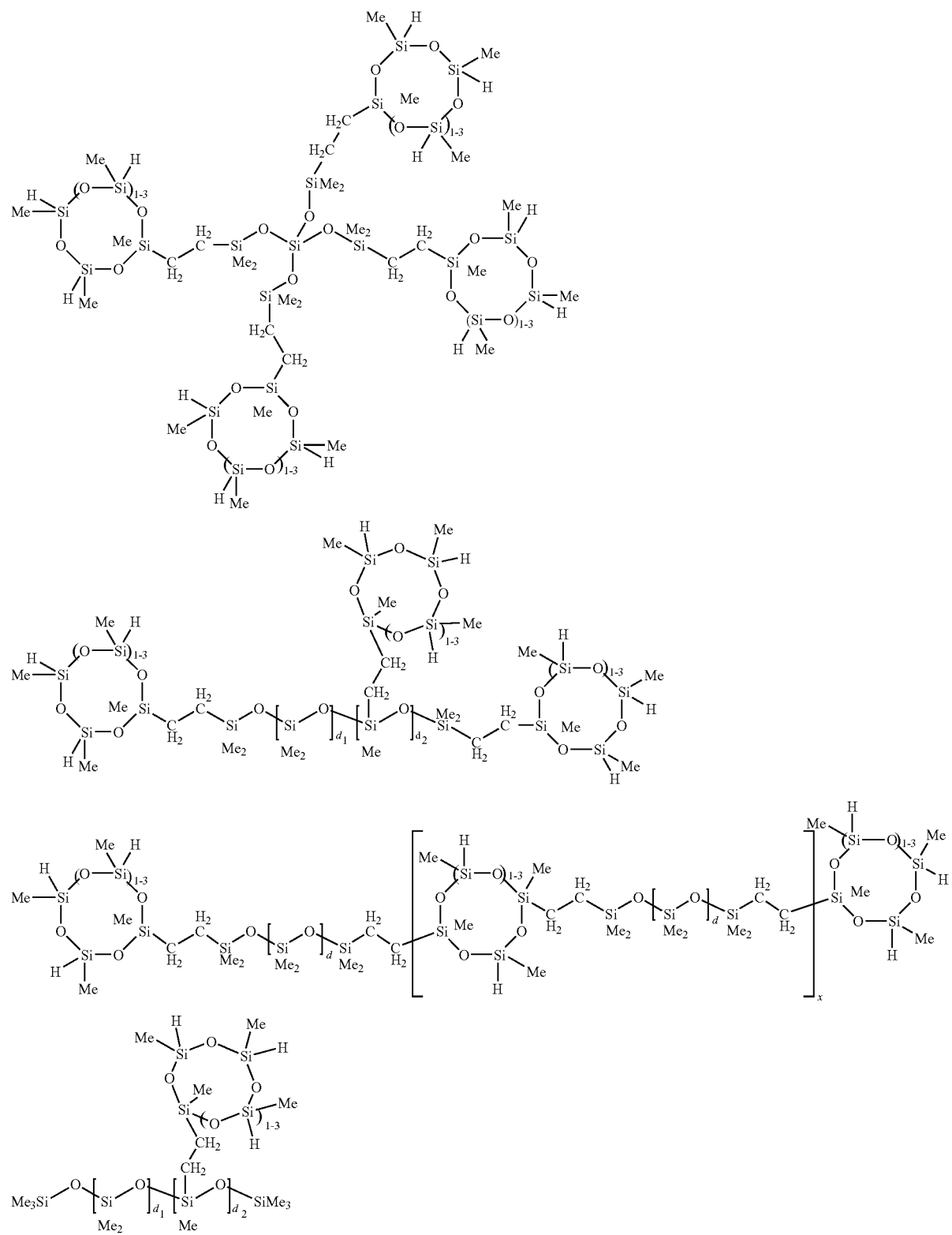

-continued
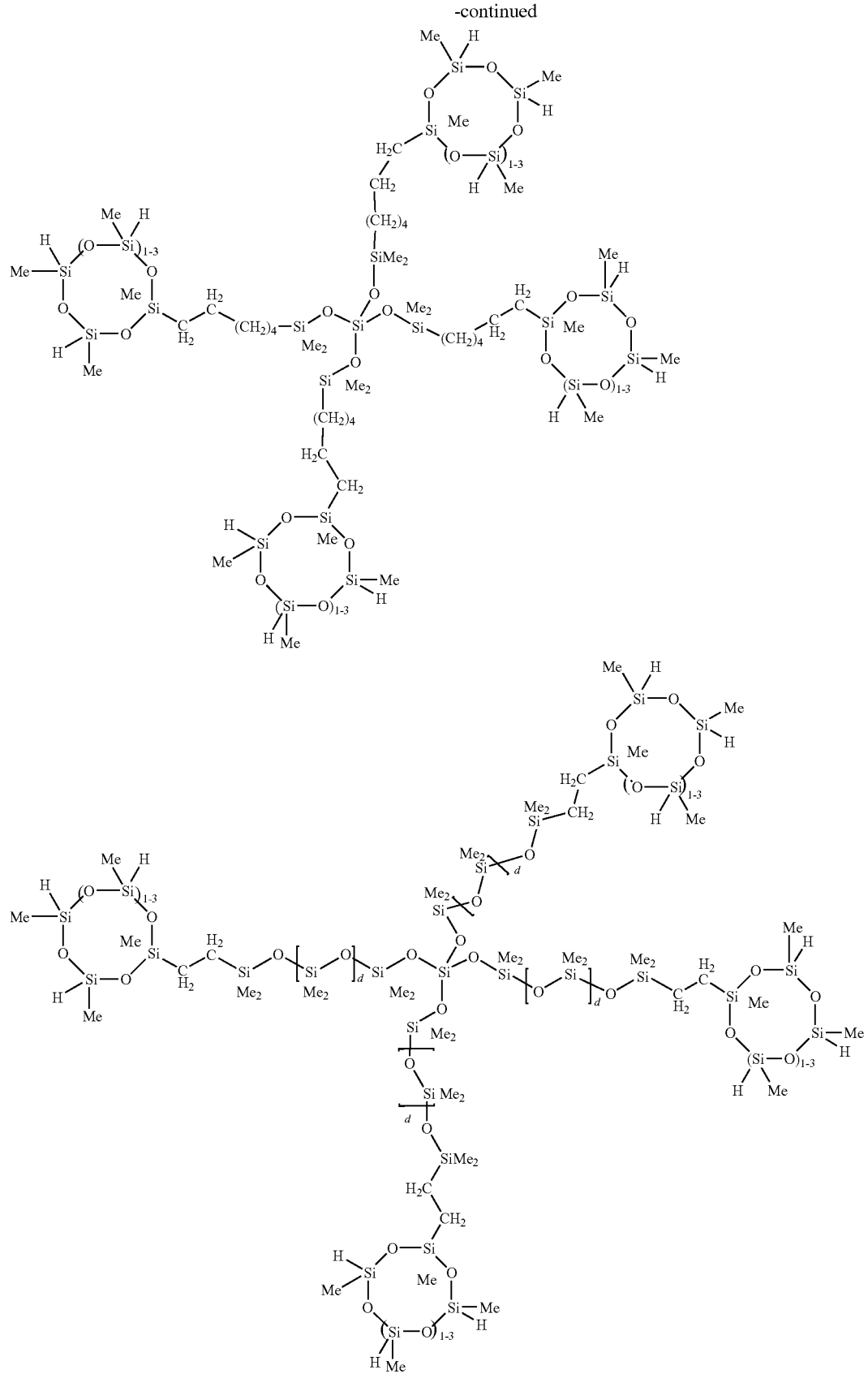

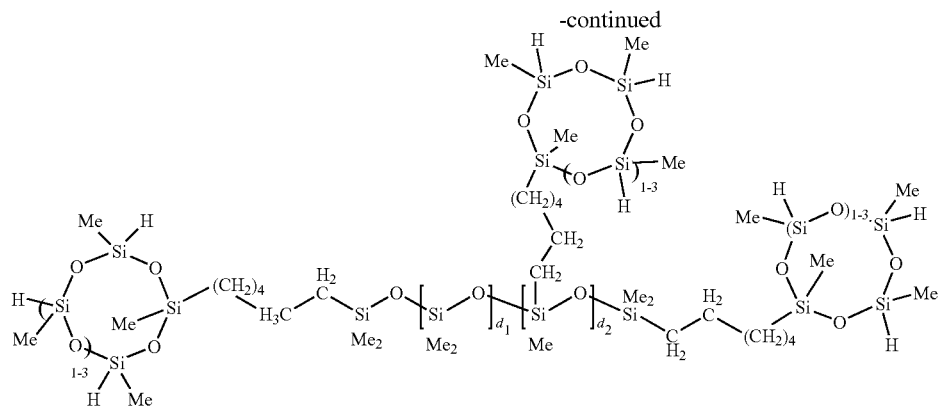

Alternatively, (D3) is exemplified by a compound described by the following where Me is methyl, d is an average of 8 and x is an integer from 1 to 15 or the compound described by the following when 10 to 30% of the SiH bonds are replaced by functional groups derived by hydrosilylation of allylglycidyl ether.

other organohydrogensiloxanes described by formula (II), the ratio of Si—H to aliphatic unsaturation or Si—H to hydroxy functionality to be used for these subsequent reactions need not follow the above recommendations but rather is limited only by the amount of SiH which is desired on such final organohydrogensiloxane.

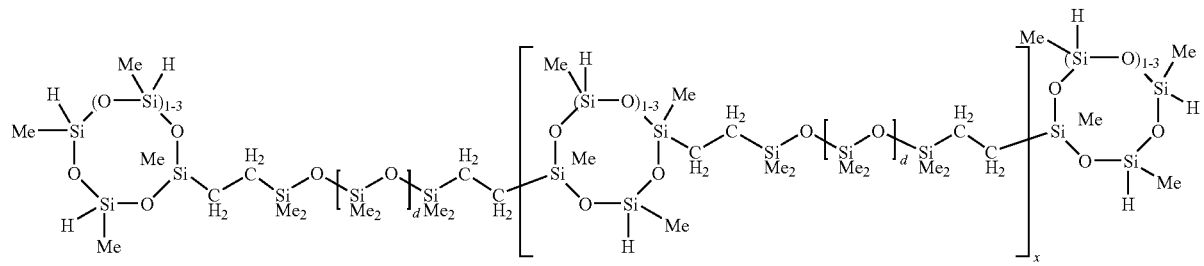

The organohydrogensiloxanes described by Formula (II) and comprising (D3) are commercially available or can be made in a straightforward manner, as described in WO 03/093349 A1 and WO 03/093369 A1. For example, the organohydrogensiloxane may be prepared via a platinum catalyzed coupling of methylhydrogencyclosiloxanes with a reactant containing aliphatic unsaturation, hydroxy functionalities or a mixture of both. The desired product is a function not only of the reactants but also of the reaction stoichiometry. The reaction can be conducted by premixing the reactants followed by catalysis or by using one of the reactants as a controlling reagent. Once an initial organohydrogensilicon compound is prepared, subsequent hydrosilylations or condensations may also be done to replace or convert some of the remaining Si—H bonds to other types of groups. After the desired organohydrogensilicon compound is made it is preferred to deactivate the catalyst using an inhibitor.

Generally, the ratio of Si—H to aliphatic unsaturation or Si—H to hydroxy functionality useful to prepare the organohydrogensiloxanes of component (D3) is at least 2.5:1. Alternatively, a ratio of Si—H to aliphatic unsaturation ratio or Si—H to hydroxy functionality of 20:1 to 2.5:1 can be used, with a ratio of 4:1 to 3:1 being most preferred. Notwithstanding the above, if organohydrogensiloxanes (D3) described by formula (II) which are prepared using the above ratios are then further hydrosilylated or condensed, for example to convert or replace some of the remaining Si—H groups and form Component (D) may include one or more organohydrogensiloxanes described by (D1), (D2), or (D3) or mixtures thereof. Alternatively, Component (D) may include one or more species of only one type of organohydrogensiloxane.

The amount of Component (D) added to the present PSA composition will depend on the Si—H groups present in the component and the total amount of alkenyl groups present in the PSA composition from Components (A) and (C) and any optional ingredients containing reactive alkenyl functionality. Generally, the Si—H:Si-alkenyl ratio is 1:1 to 40:1. Alternatively, the Si—H:Si-alkenyl ratio is 1:1 to 10:1. Alternatively, the Si—H:Si-alkenyl ratio is 1:1 to 4:1.

Component (E) comprises any catalyst typically employed for hydrosilylation reactions. It is preferred to use platinum group metal-containing catalysts. By platinum group it is meant ruthenium, rhodium, palladium, osmium, iridium and platinum and complexes thereof. Platinum group metal-containing catalysts useful in preparing the compositions of the present invention are the platinum complexes prepared as described by Willing, U.S. Pat. No. 3,419,593, and Brown et al, U.S. Pat. No. 5,175,325, each of which is hereby incorporated by reference to show such complexes and their preparation. Other examples of useful platinum group metal-containing catalysts can be found in Lee et al., U.S. Pat. No. 3,989,668; Chang et al., U.S. Pat. No. 5,036,117; Ashby, U.S. Pat. No. 3,159,601; Lamoreaux, U.S. Pat. No. 3,220,972; Chalk et al., U.S. Pat. No. 3,296,291; Modic, U.S. Pat. No.

3,516,946; Karstedt, U.S. Pat. No. 3,814,730; and Chandra et al., U.S. Pat. No. 3,928,629 all of which are hereby incorporated by reference to show useful platinum group metal-containing catalysts and methods for their preparation. The platinum-containing catalyst can be platinum metal, platinum metal deposited on a carrier such as silica gel or powdered charcoal, or a compound or complex of a platinum group metal. Preferred platinum-containing catalysts include chloroplatinic acid, either in hexahydrate form or anhydrous form, and or a platinum-containing catalyst which is obtained by a method comprising reacting chloroplatinic acid or platinum dichloride with an aliphatically unsaturated organosilicon compound such as divinyltetramethyldisiloxane, or alkene-platinum-silyl complexes as described in U.S. Pat. No. 6,605,734, such as $(COD)Pt(SiMeCl_2)_2$, where COD is 1,5-cyclooctadiene and Me is methyl. These alkene-platinum-silyl complexes may be prepared, for example by mixing 0.015 mole $(COD)PtCl_2$ with 0.045 mole COD and 0.0612 moles $HMeSiCl_2$.

The appropriate amount of the catalyst will depend upon the particular catalyst used. The platinum catalyst should be present in an amount sufficient to provide at least 2 parts per million (ppm), alternatively 5 to 200 ppm of platinum in the PSA composition. Alternatively, the platinum is present in an amount sufficient to provide 5 to 150 ppm of platinum on the same basis. The catalyst may be added as a single species or as a mixture of two or more different species. Adding the catalyst as a single species is preferred.

The composition of the present invention may also comprise an inhibitor (F). This optional component (F) can be any material that is known to be, or can be, used to inhibit the catalytic activity of platinum group metal-containing catalysts. As used herein, the term "inhibitor" means a material that retards activity of a catalyst at room temperature but does not interfere with the properties of the catalyst at elevated temperatures. Examples of suitable inhibitors include ethylenically or aromatically unsaturated amides, acetylenic compounds, silylated acetylenic compounds, ethylenically unsaturated isocyanates, olefinic siloxanes, unsaturated hydrocarbon monoesters and diesters, conjugated ene-ynes, hydroperoxides, nitriles, and diaziridines.

Alternatively, inhibitors useful in the present invention include acetylenic alcohols exemplified by 1-ethynyl-1-cyclohexanol, 2-methyl-3-butyn-2-ol, 2-phenyl-3-butyn-2-ol, 2-ethynyl-isopropanol, 2-ethynyl-butane-2-ol, and 3,5-dimethyl-1-hexyn-3-ol, silylated acetylenic alcohols exemplified by trimethyl(3,5-dimethyl-1-hexyn-3-oxy)silane, dimethyl-bis-(3-methyl-1-butyn-oxy)silane, methylvinylbis(3-methyl-1-butyn-3-oxy)silane, and ((1,1-dimethyl-2-propynyl)oxy)trimethylsilane, unsaturated carboxylic esters exemplified by diallyl maleate, dimethyl maleate, diethyl fumarate, diallyl fumarate, and bis-2-methoxy-1-methylethylmaleate, mono-octylmaleate, mono-isooctylmaleate, mono-allyl maleate, mono-methyl maleate, mono-ethyl fumarate, mono-allyl fumarate, and 2-methoxy-1-methylethylmaleate; conjugated ene-ynes exemplified by 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, and 3-phenyl-3-butene-1-yne, vinylcyclosiloxanes such as 1,3,5,7-tetramethyl-1,3,5,7-tetravinylcyclotetrasiloxane, and a mixture of a conjugated ene-yne as described above and a vinylcyclosiloxane as described above.

Alternatively, the inhibitors include diallyl maleate, bis-2-methoxy-1-methylethylmaleate, 1-ethynyl-1-cyclohexanol, and 3,5-dimethyl-1-hexyn-3-ol.

Generally when inhibitor is added to the composition, it will be added in amounts from 0.05 to 1 weight percent in the PSA composition. Alternatively, 0.05 to 0.5 weight percent of inhibitor may be used on the same basis.

In general, the solventless PSA composition of the present invention can further include other additives provided the additive does not adversely affect the physical properties of the PSA composition, particularly peroxide secondary cure catalysts, small amounts of vinyl containing-resins, rare earth stabilizers or silica additives.

The order of addition of these ingredients is important to reach the desired final composition. The preferred method of synthesis is to mix Component A with Component B and strip the resin solvent at elevated temperature/reduced pressure before adding Components C, D and optionally F while the stripped mixture is still warm. Component (E) should be added when mixture is cool and PSA is ready to be coated on an article or support. This procedure should not be construed as limiting; variations on this procedure can be used as long as the integrity of the components is unchanged and a final viscosity is obtained which allows workability. The composition may be prepared as a one-part or have multiple parts if desired.

The mixing of ingredients can be done using any equipment known in the art. The temperature that such mixing is done is also not critical as long as the stripping procedure is accomplished and the integrity of the ingredients is not compromised. Alternatively, the solvent is stripped under reduced pressure while increasing the temperature to 150° C. Mixing of additional ingredients is preferably conducted below the flashpoint of the ingredients; for use of tetradecene, 90 to 100° C. is preferred.

The invention also relates to an article having on at least one surface the solventless pressure sensitive adhesive described above.

The silicone composition of the present invention can be applied to many different articles or supports including but not limited to polyester film, polyimide film, silicone rubber or foam, metal, glass impregnated cloth, paper or plastic coated paper, and fluorocarbon or fluorosilicone treated supports.

The silicone PSA composition of the present invention can be applied to an article or support by any suitable means such as roll-coating, knife-coating, blade-coating, knife-over-roll coating, gravure coating, dipping, brushing or spraying. Additionally, the present PSA composition can be applied to an article or support substrate by the method of stencil printing.

Silicone PSAs are useful in a variety of applications by virtue of their unique properties, including excellent adhesive and cohesive strength, high tack, very low alpha particle emissions, good moisture resistance, good resistance to hot or cold environments, good electrical properties, high ionic purity, and good adhesion to low energy substrates. For example, silicone PSAs are widely used in adhesive tapes, bandages, low-temperature backings, transfer films, labels, emblems and decorative or informative signs. In addition, silicone PSAs are used in the assembly of automotive parts, toys, electronic circuits and keyboards. The advantageous performance of these compositions at high temperatures allows them to be used in applications where the adhesive needs to demonstrate good hold and durability at high temperatures. It is especially beneficial that a silicone PSA can demonstrate these performance attributes and be applied in a solventless format with a very workable viscosity. The solventless format gives advantages in reduced flammability, inventory space required and environmental friendliness.

The following examples are disclosed to further teach, but not limit, the invention, which is properly delineated by the appended claims.

EXAMPLES A AND B

Ingredients

Polymer A: a dimethylvinyl-endblocked polydimethylsiloxane fluid having a viscosity of about 300 to 600 centipoise (mPa·s).

Resin A (in solvent): an organopolysiloxane resin consisting of $(CH_3)_3SiO_{1/2}$ siloxane units (M units) and $SiO_{4/2}$ units (Q units) with a Mw of about 11,000 and an M/Q ratio between 0.6 and 0.9 and SiOH content <1 wt %.

Resin B (in solvent): an organopolysiloxane resin consisting of $(CH_3)_3SiO_{1/2}$ siloxane units and $SiO_{4/2}$ units with an Mw of about 8,000 and an M/Q ratio of between 0.6 and 0.9 and SiOH content <1 wt %.

Crosslinker (Organohydrogenpolysiloxane A): a trimethylsiloxy-terminated methylhydrogen dimethylsiloxane having an average of five methylhydrogensiloxane units and three dimethylsiloxane units per molecule.

Crosslinker (Organohydrogenpolysiloxane B): a hydrosilylation reaction product of (I) an organohydrogenpolysiloxane selected from cyclic siloxanes having the formula (RSiHO)x where R=Me and x=3 to 20, and (II) an unsaturated organic compound selected from an alpha-alkene having 2 to 18 carbon atoms.

Reactive diluent (Additive A): 1-tetradecene

Non-reactive diluent (Additive B): Linear aliphatic hydrocarbon solvent (686 Solvent from Exxon)

Catalyst: a vinyl polymer diluted platinum complex of 1,3-diethenyl-1,1,3,3-tetramethyldisiloxane where the Pt level is ~5200 ppm.

Inhibitor: Bis(2-methoxy-1-methylethyl) maleate

Example A

Preparation of (Comparative) Solventless A 24.21 parts of Polymer A and 72.72 parts of Resin B solution (~70% solids) were combined and thoroughly blended. The mixture was then stripped at 130° C. and full vacuum for 1 hour to remove volatile materials. Mixture was then cooled to 100° C. and 0.95 parts of Organohydrogenpolysiloxane B and 2.0 parts of Additive B were added and blended into the mixture. The material was then cooled and 0.12 parts of Inhibitor was thoroughly blended into the mixture. 100 parts of this material was then combined with 0.5 parts of Catalyst and mixed until homogeneous. The sample was then coated onto a 2-mil thick sheet of polyester and a 1-mil thick sheet of polyimide using a 1.5-mil coating bar. Each sheet was then cured at 150° C. for 3 minutes. Adhesive properties are listed in Table 1.

Example B

Preparation of Solventless B 26.43 parts of Polymer A and 67.2 parts of Resin A solution (~70% solids) were combined and thoroughly blended. The mixture was then stripped at 130° C. and full vacuum for 1 hour to remove volatile materials. Mixture was then cooled to 100° C. and 3.93 parts of Organohydrogenpolysiloxane A and 2.35 parts of Additive A were added and blended into the mixture. The material was then cooled and 0.09 parts of Inhibitor was thoroughly blended into the mixture. 100 parts of this material was then combined with 0.4 parts of Catalyst and mixed until homogeneous. The sample was then coated onto a 2-mil thick sheet of polyester and a 1-mil thick sheet of polyimide using a 1.5-mil coating bar. Each sheet was then cured at 150° C. for 3 minutes. Adhesive properties are listed in Table 1.

TABLE 1

| | Adhesive Properties | | | | |
|---|---|---|---|---|---|
| Sample | 2-mil Polyester Adhesion (oz/in) | 1-mil Polyimide Adhesion (oz/in) | 2-mil Polyester Tack (grams) | 1-mil Polyimide Tack (grams) | High Temperature Shear, (° F.)* |
| Solventless B (Comp) | 37 | 21 | 1229 | 890 | 500 Pass |
| Solventless A | 60 | 32 | 1417 | 996 | 400 Pass 500 Fail |

*The lap shear test conditions are 1 kg wt suspended from a 1 in. × 1 in. test area for 5 days. The maximum temperature up to 500° F. at which the adhesive passes the test is recorded.

Ingredients for Ex 1-10 and Comparative Ex 1-4 (Tables 2 and 3):

Polymer A: a dimethylvinyl terminated polydimethylsiloxane fluid having a viscosity of about 450 mPa·s and a vinyl content of 0.44% by weight.

Polymer B: a dimethylvinyl terminated polydimethylsiloxane fluid having a viscosity of about 200 mPa·s and a vinyl content of 0.68% by weight.

Polymer C: a dimethylvinyl terminated branched polydimethylsiloxane-silicate copolymer having a viscosity of about 100 mPa·s and a vinyl content of 1.4% by weight.

Oganohydrogensiloxane A: a trimethylsiloxy terminated methylhydrogen dimethylsiloxane copolymer having an SiH (as H) of 0.78% by weight.

Organohydrogensiloxane B: a trimethylsiloxy terminated methylhydrogen dimethylsiloxane copolymer having a SiH (as H) content of 1.05% by weight.

Organohydrogensiloxane C: a trimethylsiloxy terminated polymethylhydrogensiloxane fluid having a SiH(as H) content of 1.6% by weight.

Organohydrogensiloxane D: a trimethylsiloxy terminated methylhydrogen dimethylsiloxane hydrocarbyl copolymer based fluid mixture having a SiH(as H) content of 0.94% by weight.

Organohydrogensiloxane E: a trimethylsiloxy terminated methylhydrogen dimethylsiloxane hydrocarbyl copolymer based fluid mixture having a SiH(as H) content of 0.70% by weight, manufactured and sold by Dow Corning Corporation under the Syl-Off® trademark.

Organohydrogensiloxane F: a cyclic methylhydrogen dimethylsiloxane hydrocarbyl copolymer fluid having a SiH(as H) content of 0.04% by weight, manufactured and sold by Dow Corning Corporation under the Syl-Off® trademark.

Resin A (in solvent): an organopolysiloxane resin consisting of $(CH_3)_3SiO_{1/2}$ units (M units) and $SiO_{4/2}$ units (Q units) with a $M_w$ of ~18000 as measured using triple detection GPC methodology, a M/Q ratio of about 1.0, a silanol content of $\leq 1.0\%$ by weight and a resin content of about 70% by weight Resin B (in solvent): an organopolysiloxane resin consisting of $(CH_3)_3SiO_{1/2}$ units (M units) and $SiO_{4/2}$ units (Q units) with a $M_w$ of ~21000 as measured using triple detection GPC techniques, a M/Q ratio of about 0.9, a silanol content of $\leq 1.0\%$ by weight and a resin content of about 62% by weight.

Inhibitor A: bis(2-methoxy-1-methylethyl) maleate
Inhibitor B: diallylmaleate
Reactive Diluent A: Tetradecene
Pt catalyst: A vinyl polymer diluted platinum complex of 1,3-diethenyl-1,1,3,3-tetramethyldisiloxane where the Pt level is about 5200 ppm.

PSA Base Formulation: A 500 mL one-neck round-bottom flask was charged with resin solution and polymer. The solvent was stripped at 100° C., 20-40 mm Hg followed by 150° C., 20 mm Hg. The resin-polymer solution was cooled to 100° C. and the specified quantities of organohydrogensiloxane, reactive diluent and inhibitor blended into the resin-polymer solution to give a Solventless Pressure Sensitive Adhesive Base. The batch size in all cases was 150 g. Ingredients and results are shown in Table 2.

Curable Adhesive Formulation: The Solventless Pressure Sensitive Adhesive Base was formulated with 0.4 parts of Pt catalyst to yield a curable formulation. The formulation was coated onto 2 mil polyester for tack and adhesion testing and 1 mil polyimide film for cohesive failure/high temperature hold testing using a drawdown bar selected to give an adhesive thickness of ~1.5-2.0 mil as measured with a micrometer. The cure regimen was 3 minutes at 150 C. Results are shown in Table 2.

Reference PSA: Dow Corning® 7735 is a peroxide cured PSA designed to give low release forces with Dow Corning® Q2-7785 Release Coating. In this example, a 2% level of dibenzoyl peroxide based on silicone solids is used for curing.

Fluoro-release coating: Dow Corning® Q2-7785 Release Coating is a fluoro functional release coating designed to give low release properties with silicone PSA's.

Property Measurements

Resin Mw measurements: Resin samples were diluted in ethyl Acetate to approximately 10 mg/mL, filtered with a 0.45 um PTFE filter and analyzed by GPC3. Dn/dc was determined to be 0.055 for all of these materials and sample concentration was calculated from RI area. ASTM Certified Polystyrene, 94637 Mw, was used for instrument calibration. Analysis was performed using a Viscotek T-301 Triple Detector Array (Refractive Index, Viscometry and 90-degree Light Scattering) along with a Waters 515 pump, a 717 Autosampler and an on-line degasser. A Polymer Laboratories 5u 100A (100×7.8 mm) column was installed for FIPA (Flow Injection Polymer Analysis).

The separation was performed using HPLC grade Ethyl Acetate programmed to run at 1.0 mL/min., injection volume was 100 μL and both columns and detectors were thermally controlled at 35° C. Data collection was 15 minutes and processed using Viscotek OmniSec version 2.0.0.80.

Tack: A Polyken Probe Tack instrument was used to obtain tack measurements from samples coated onto 2 mil polyester film. Instrument settings were dwell time 1.0 sec and probe speed of 0.5 cm/sec. Results are shown in Table 2.

Adhesion: A Keil tester was used to pull a 1 inch (2.5 cm) wide strip of adhesive coated onto 2 mil polyester film from a clean stainless steel panel at 12 inches per minute (0.3 m/min). Results are shown in Table 2.

Cohesive strength/High Temperature Hold (HTH): A 1 inch (6.25 sq cm) square sample of adhesive coated onto 1 mil polyimide films was adhered to a clean stainless steel panel, rolled twice with a 2 lb roller and a 1 kg weight hung from the sample. The samples were placed into an oven at 500° F. (260° C.) for 5 days. Results are shown in Table 2.

Evaluation of Release Properties: The PSA of this invention and the reference PSA were applied to the fluoro-release coating using wet cast and dry cast techniques. Release was measured using 3M90 and ZPE-1000 peel testers from Instrumentors, Inc. Results are shown in Table 3.

TABLE 2

|  | Comp Example 1 | Comp Example 2 | Comp Example 3 | Comp Example 4 | Example 1 | Example 2 | Example 3 | Example 4 |
|---|---|---|---|---|---|---|---|---|
| Resin A | 124.8 |  | 126.9 | 124.8 | 127.3 | 119.1 | 119.1 | 119.1 |
| Resin B |  | 132.5 |  |  |  |  |  |  |
| Polymer A | 60.8 | 64.7 | 53.7 | 60.8 | 48.7 | 51.1 | 53.1 | 55.5 |
| Polymer B |  |  |  |  |  |  |  |  |
| Polymer C |  |  |  |  |  |  |  |  |
| Diluent A |  |  |  | 4.5 | 4.5 | 6.8 | 6.8 | 6.8 |
| Organohydrogen siloxane A | 2.4 | 2.7 | 7.9 | 2.4 | 7.9 | 9.1 |  |  |
| Organohydrogen siloxane B |  |  |  |  |  |  | 7.0 |  |
| Organohydrogen siloxane C |  |  |  |  |  |  |  | 4.6 |
| Organohydrogen siloxane D |  |  |  |  |  |  |  |  |
| Organohydrogen siloxane E |  |  |  |  |  |  |  |  |
| Organohydrogen siloxane F |  |  |  |  |  |  |  |  |
| Inhibitor A |  |  |  |  | 0.2 | 0.2 | 0.2 | 0.2 |
| Inhibitor B | 0.1 | 0.1 | 0.1 | 0.1 |  |  |  |  |
| SiH/Vi | 1.8 | 2.0 | 7.0 | 0.6 | 2.0 | 1.7 | 1.7 | 1.7 |
| Final Resin % | 58 | 55 | 59 | 56 | 59 | 55 | 55 | 55 |
| R/P | 58:42 | 55:45 | 59:41 | 58:42 | 61:39 | 58:42 | 58:42 | 58:42 |
| Viscosity (mPa·s) | >2 MM | 1330000 | >2 MM | 60000 | 92000 | 7200 | 18500 | 23000 |
| Tack (grams) | 284 | 411 | 349 | 647 | 870 | 986 | 599 | 399 |
| Adhesion (kg/m) | 34 | 24 | 54 | 34 | 58 | 28 | 35 | 34 |
| High Temp Hold (HTH) | Pass | Pass | Pass | Fail | Pass | Pass | Pass | Pass |

TABLE 2-continued

|  | Example 5 | Example 6 | Example 7 | Example 8 | Example 9 | Example 10 |
|---|---|---|---|---|---|---|
| Resin A | 119.1 | 119.8 | 119.2 | 125.3 | 125.3 | 127.3 |
| Resin B |  |  |  |  |  |  |
| Polymer A | 52.3 | 55.3 | 52.7 | 49.7 |  |  |
| Polymer B |  |  |  |  | 46.3 |  |
| Polymer C |  |  |  |  |  | 36.0 |
| Diluent A | 6.8 | 6.0 | 6.8 | 6.8 | 4.5 | 4.5 |
| Organohydrogen siloxane A |  |  |  |  |  |  |
| Organohydrogen siloxane B |  |  |  |  |  |  |
| Organohydrogen siloxane C |  |  |  |  |  |  |
| Organohydrogen siloxane D | 7.8 | 5.1 |  |  |  |  |
| Organohydrogen siloxane E |  |  | 7.4 | 6.1 |  |  |
| Organohydrogen siloxane F |  |  |  |  | 10.4 | 20.8 |
| Inhibitor A | 0.2 | 0.2 | 0.2 | 0.2 |  |  |
| Inhibitor B |  |  |  |  | 0.1 | 0.1 |
| SiH/Vi | 1.7 | 1.2 | 1.2 | 1.0 | 1.2 | 2.0 |
| Final Resin % | 55 | 56 | 55 | 59 | 59 | 59 |
| R/P | 58:42 | 58:42 | 58:42 | 61:39 | 61:39 | 61:39 |
| Viscosity (mPa·s) | 28500 | 34000 | 25000 | 84000 | 106000 | 150000 |
| Tack (grams) | 623 | 692 | 711 | 619 | 835 | 512 |
| Adhesion (kg/m) | 37 | 39 | 35 | 51 | 57 | 40 |
| High Temp Hold (HTH) | Pass | Pass | Pass | Pass | Pass | Pass |

TABLE 4

| | Release Force(g/2.5 cm) vs Peel Speed (m/min) against Dow Corning ® Q2-7785 Release Coating | | | | | |
|---|---|---|---|---|---|---|
| | 0.3 (m/min) | 90 | 400 | 1200 | 4000 | 12000 |
| Example 1 Wet cast | 21 (g/2.5 cm) | 19 | 17 | 21 | 20 | 12 |
| Example 1 Dry cast | 6 | 7 | 9 | 14 | 14 | 12 |
| Reference Dow Corning ® 7735 Peroxide Cured PSA Wet Cast | 10 | 11 | 10 | 13 | 16 | 18 |
| Reference Dow Corning ® 7735 Peroxide Cured PSA Dry Cast | 3 | 3 | 5 | 7 | 8 | 9 |

The invention claimed is:

1. A solventless pressure sensitive adhesive (PSA) comprising (A) 15 to 40 weight percent of at least one organosiloxane polymer having on average at least two aliphatic unsaturations per molecule; (B) 50 to 80 weight percent of at least one resin having $R_3SiO_{1/2}$ (M units) and $SiO_{4/2}$ (Q units) where each R is an independently chosen monovalent hydrocarbon group free from aliphatic unsaturation and comprising 1 to 20 carbon atoms; (C) 2 to 7 weight percent of at least one reactive diluent comprising at least one hydrocarbon compound comprising 8 to 18 carbon atoms and at least one aliphatic unsaturation; (D) at least one Si—H containing crosslinker comprising an organohydrogensilicon compound having on average at least two silicon bonded hydrogen atoms per molecule; (E) at least one hydrosilylation catalyst; and (F) optionally at least one inhibitor.

2. The solventless PSA of claim 1 where Component (A) is chosen from hexenyldimethylsiloxy-terminated polydimethylsiloxane-polymethylhexenylsiloxane copolymers, hexenyldimethylsiloxy-terminated polydimethylsiloxane polymers, vinyldimethylsiloxy-terminated polydimethylsiloxane polymers, vinyl or hexenyldimethylsiloxy-terminated poly(dimethylsiloxane-silicate) copolymers, mixed trimethylsiloxy-vinyldimethylsiloxy terminated poly(dimethylsiloxane-vinylmethylsiloxane-silicate) copolymers, and vinyl or hexenyldimethylsiloxy terminated poly(dimethylsiloxane-hydrocarbyl) copolymers having a viscosity from 150 to 499 mPa·s at 25° C.

3. The solventless PSA of claim 1 where component (D) is chosen from (D1) diorganohydrogensiloxy-terminated polydiorganosiloxane polymers, diorganohydrogensiloxy-terminated polyorganohydrogensiloxane polymers, diorganohydrogensiloxy-terminated polydiorganosiloxane-polyorganohydrogensiloxane copolymers, triorganosiloxy-terminated polydiorganosiloxane-polyorganohydrogensiloxane copolymers, triorganosiloxy-terminated polyorganohydrogensiloxane polymers where the organo substituent on these organohydrogensiloxanes comprises a monovalent hydrocarbon group having from 1 to 20 carbon atoms;

(D2) an organohydrogensiloxane reaction product having a viscosity of from 150 to 50,000 mPa·s obtained by mixing: (a) at least one organohydrogensiloxane containing at least three silicon-bonded hydrogen groups per molecule, (b) at least one compound containing at least two alkenyl groups per molecule, and (c) a platinum group metal-containing catalyst which is present in an amount sufficient to provide 0.1 to 10 weight parts of platinum group metal per million weight parts of (a)+(b), with the proviso that the ratio of the number of silicon-bonded hydrogen atoms of Component (a) to the number of alkenyl groups of Component (b) is at least 4.6:1; and (D3) an organohydrogensiloxane containing at least two silicon-bonded hydrogen atoms per molecule described by formula (II):

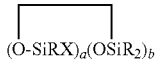

$(O-SiRX)_a(OSiR_2)_b$ where each R is independently selected from a hydrogen atom and a monovalent hydrocarbon group comprising 1 to 20 carbon atoms which is free from aliphatic unsaturation, a is an integer from 1 to 18, b is an integer from 1 to 19, a+b is an integer from 3 to 20, each X is an independently selected functional group selected from a halogen atom, an ether group, an alkoxy group, an alkoxyether group, an acyl group, an epoxy group, an amino group, or a silyl group, or a -Z-$R^4$ group, where each Z is independently selected from an oxygen and a divalent hydrocarbon group comprising 2 to 20 carbon atoms, each $R^4$ group is independently selected from —$BR_uY_{2-u}$, —$SiR_vY_{3-v}$, or a group described by formula (III):

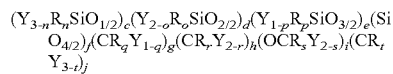

$(Y_{3-n}R_nSiO_{1/2})_c(Y_{2-o}R_oSiO_{2/2})_d(Y_{1-p}R_pSiO_{3/2})_e(SiO_{4/2})_f(CR_qY_{1-q})_g(CR_rY_{2-r})_h(OCR_sY_{2-s})_i(CR_tY_{3-t})_j$ where B refers to boron, each R is as described above, the sum of c+d+e+f+g+h+i+j is at least 2, n is an integer from 0 to 3, o is an integer from 0 to 2, p is an integer from 0 to 1, q is an integer from 0 to 1, r is an integer from 0 to 2, s is an integer from 0 to 2, t is an integer from 0 to 3, u is an integer from 0 to 2, v is an integer from 0 to 3, each Y is an independently selected functional group selected from a halogen atom, an ether group, an alkoxy group, an alkoxyether group, an acyl group, an epoxy group, an amino group, or a silyl group, or a Z-G group, where Z is as described above, each G is a cyclosiloxane described by formula (IV):

$(OSiR)(OSiRX)_k(OSiR_2)_m$ where R and X are as described above, k is an integer from 0 to 18, m is an integer from 0 to 18, k+m is an integer from 2 to 20, provided in formula (III) that one of the Y groups is replaced by the Z group bonding the $R^4$ group to the cyclosiloxane of formula (II), and provided further if g+h+i+j>0 then c+d+e+f>0.

4. The solventless PSA of claim 1 where the reactive diluent comprises at least one alkene comprising 12 to 14 carbon atoms having a terminal double bond.

5. The solventless PSA of claim 1 where the reactive diluent is tetradecene.

6. The solventless PSA of claim 1 where the M:Q ratio of the resin (B) is from 0.6:1 to 1.9:1 and it contains no more than 1 weight percent silanol.

7. An article having on at least one surface the solventless PSA of claim 1.

8. The article of claim 7 where the article is chosen from polyester film, polyimide film, silicone rubber or foam, metal, glass impregnated cloth, paper or plastic coated paper, and fluorocarbon or fluorosilicone treated supports.

* * * * *